United States Patent [19]

Hara

[11] Patent Number: 4,498,359

[45] Date of Patent: Feb. 12, 1985

[54] SYSTEM FOR DETECTING RANGES IN AN AUTOMATIC TRANSMISSION FOR VEHICLES

[75] Inventor: Kazuo Hara, Musashino, Japan

[73] Assignee: Fuji Jukogyo Kabushiki Kaisha, Tokyo, Japan

[21] Appl. No.: 324,711

[22] Filed: Nov. 24, 1981

[30] Foreign Application Priority Data

Nov. 27, 1980 [JP] Japan .................... 55-167112

[51] Int. Cl.³ .............. B60K 41/00; G01D 11/00; F02N 17/00; H01H 9/06
[52] U.S. Cl. .................................. 74/850; 74/875; 116/28.1; 123/179 K; 200/61.88
[58] Field of Search ......... 74/850, 878, 843, DIG. 7, 74/875; 123/179 K, 179 R, 339; 116/28.1, DIG. 20; 340/52 F, 78, 521; 307/10 R; 200/61.88, 61.91; 180/279

[56] References Cited

U.S. PATENT DOCUMENTS

| | | | |
|---|---|---|---|
| 3,726,265 | 4/1973 | Howard | 123/179 K |
| 3,747,437 | 7/1973 | Hauser | 123/179 K X |
| 4,051,915 | 10/1977 | Behrens | 123/179 R X |
| 4,191,051 | 3/1980 | Kawata et al. | 123/339 |
| 4,223,657 | 9/1980 | Sato et al. | 74/850 X |

Primary Examiner—Allan D. Herrmann
Assistant Examiner—Joseph M. Rolnicki
Attorney, Agent, or Firm—Martin A. Farber

[57] ABSTRACT

A system for detecting the neutral range state of an automatic transmission for an engine powered vehicle having a select lever for changing ranges of the automatic transmission. The automatic transmission has a starting circuit comprising a battery, a starter switch, an inhibitor switch, and a starter which are connected in series. The inhibitor switch is turned on when the select lever of the automatic transmission is in a neutral position. The system further has a circuit responsive to voltages at both ends of the inhibitor switch for producing an output when the inhibitor switch is closed, whereby the closing of the inhibitor switch is detected.

3 Claims, 2 Drawing Figures

SYSTEM FOR DETECTING RANGES IN AN AUTOMATIC TRANSMISSION FOR VEHICLES

BACKGROUND OF THE INVENTION

The present invention relates to a system for detecting the neutral range state and driving range state in an automatic transmission for a vehicle.

In an automatic transmission, the idling speed in the driving range is different from the idling speed in the neutral range because of the difference in load. The difference between the idling speeds must be adjusted by an adjusting device. In order to perform such an adjustment, it is necessary to detect whether the automatic transmission is in the neutral range or the driving range. However, provision of an additional switch for such a particular purpose will raise the manufacturing cost and make the construction complicated.

SUMMARY OF THE INVENTION

Accordingly, it is an object of the present invention to provide a simple detecting system for an automatic transmission for a vehicle making use of an inhibitor switch which is generally provided in a conventional automatic transmission to actuate a starter only when the gear is in the neutral position.

According to the present invention, there is provided a system for detecting the neutral range state of an automatic transmission for an engine powered vehicle having a select lever for changing ranges of said automatic transmission, comprising a battery, a starter switch, an inhibitor switch, and a starter which are connected in series; the inhibitor switch being turned on when the select lever of the automatic transmission is in a neutral position; and a circuit means responsive to voltages at both ends of the inhibitor switch for producing an output when the inhibitor switch is closed, the circuit means comprising a pair of diodes connected to both ends of the inhibitor at a cathode of each diode, a voltage supply for applying a voltage to an anode of each diode, and a logic gate connected to the anode of each diode so as to detect the neutral range state whereby the closing of the inhibitor switch is detected.

The present invention will become apparent from the following description of embodiment with reference to the accompanying drawings.

DETAILED DESCRIPTION OF THE PREFERRED EMBODIMENTS

Figure 1:
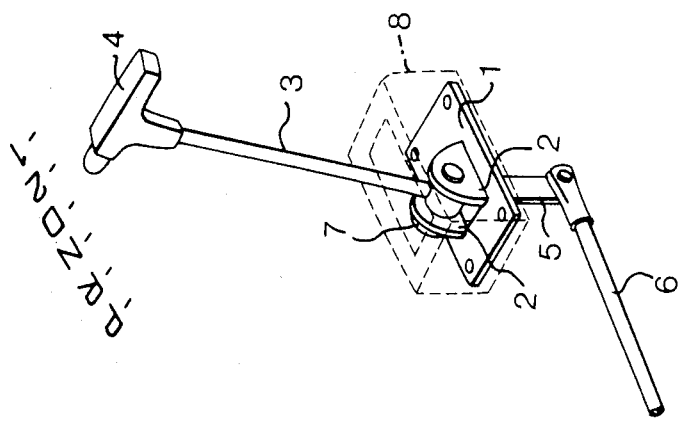
FIG. 1 is a perspective view showing a select lever provided with an inhibitor switch.

FIG. 1 shows a select lever and the vicinity of an inhibitor switch. On a plate 1 secured on a car floor, a pair of support plates 2 are vertically attached and rotatably support a select lever 3. The select lever 3 has at its upper end a T-shaped knob 4 and at its lower end a coupling member 5 which is connected to a transmission through a rod 6. An inhibitor switch 7 is provided on the outside of one of the support plates 2. A cover 8 is provided over the plate 1. The select lever 3 can be shifted to six positions, that is positions P, R, N, D, 2, 1 and only when the lever is set at P position (parking) and N position (neutral), does the inhibitor switch 7 turns on.

Figure 2:
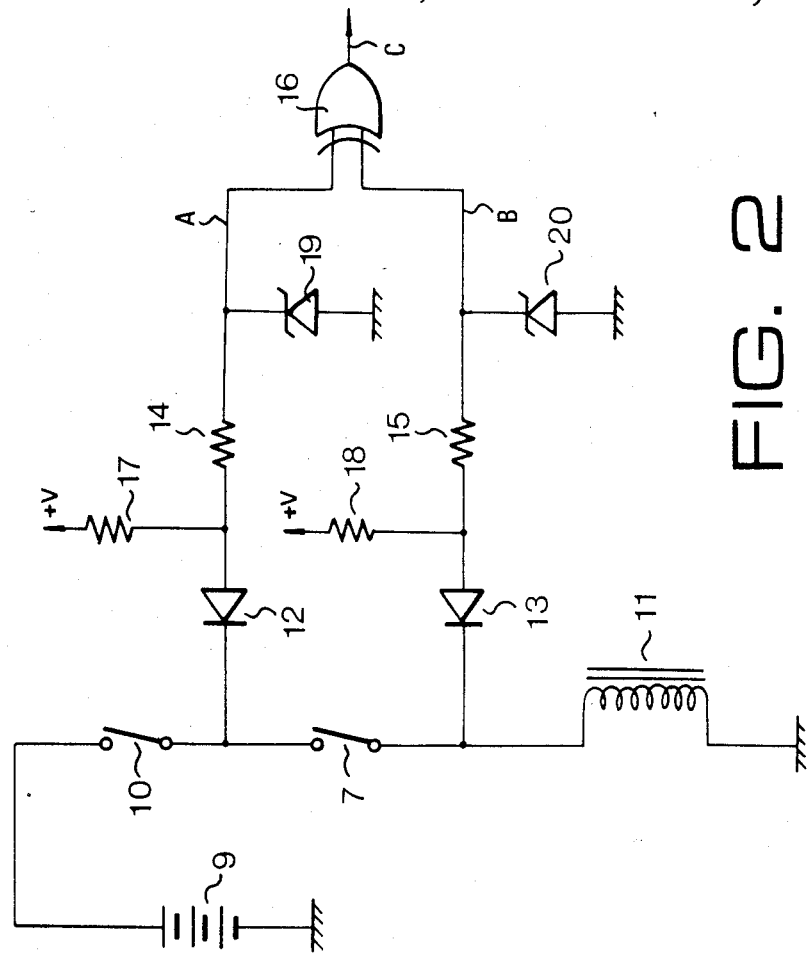
FIG. 2 is an electric circuit in accordance with an embodiment of the present invention

FIG. 2 shows an electric circuit according to an embodiment of the present invention. A battery 9 is connected in series to a starter switch 10, the inhibitor switch 7, and a starter 11. Connected respectively at both ends of the inhibitor switch 7 are cathodes of diodes 12, 13 which are in turn connected to an exclusive OR gate 16 through resistors 14, 15 respectively, and which are applied with positive voltage through resistors 17, 18, respectively. The input side of the exclusive OR gate 16 is grounded through zener diodes 19, 20.

The operation of the system of the present invention will be explained hereinafter.

Starting of the engine is done by closing the starter switch 10. But while the select lever 3 is in positions other than P or N position, turning-on of the starter switch 10 does not actuate the starter 11 because the inhibitor switch 7 is held off. When the select lever 3 is in P or N position, the inhibitor switch 7 is turned on, so that the turning-on of the starter switch 10 actuates the starter 11.

Because of the application of positive voltage to both ends of the inhibitor switch 7 through the diodes 12, 13, operation of the inhibitor switch 7 and the starter switch 10 causes the variation of signals A, B which are sent to the exclusive OR gate 16, and consequently causes the output C therefrom to vary. The variations are as follows.

| Starter switch 10 | on | on | off | off |
| --- | --- | --- | --- | --- |
| Inhibitor switch 7 | on | off | on | off |
| Starter 11 | on | off | off | off |
| Input signal A | high | high | low | high |
| Input signal B | high | low | low | low |
| Output signal C | low | high | low | high |

From the above operation, it the fact will be seen that the low level output signal C from the exclusive OR gate 16 corresponds to the on-state of the inhibitor 7. Thus, the fact that the inhibitor switch 7 is closed or the automatic transmission is in the neutral range state can be electrically detected. The output signal from the exclusive OR gate 16 can be used as an input signal to another device, such as an idling speed governor.

According to the present invention, the neutral range state of the automatic transmission is detected, making use of an inhibitor switch which is readily provided in any automatic transmission. Thus, there is no need for any additional particular means for detecting the neutral range state. As a result, the system can be provided with a simple construction at low manufacturing cost.

What is claimed is:

1. A system for detecting a neutral range state of an automatic transmission for an engine powered vehicle having a select lever for changing ranges of said automatic transmission, comprising a battery, a starter switch, an inhibitor switch, and a starter which are connected in series, said inhibitor switch being turned on when said select lever of said automatic transmission is in a neutral position; and a circuit means responsive to voltages at both ends of said inhibitor switch for producing an output when said inhibitor switch is closed, said circuit means comprising a pair of diodes connected to said both ends of said inhibitor switch at a cathode of each of said diodes, respectively, a voltage supply for applying a voltage to an anode of each said diode, and an exclusive OR gate connected to said anode of each said diode, whereby the neutral range state is detected.

2. The system according to claim 1, further comprising:
zener diodes connected between ground and each input respectively of said exclusive OR gate.

3. A system for detecting a neutral range state of an automatic transmission for an engine powered vehicle having a select lever for changing ranges of said automatic transmission, comprising a battery, a starter switch, an inhibitor switch, and a starter which are connected in series, said inhibitor switch being turned on when said select lever of said automatic transmission is in a neutral position; and a circuit means responsive to voltages at both ends of said inhibitor switch for producing an output when said inhibitor switch is closed, said circuit means comprising a pair of diodes connected to said both ends of said inhibitor switch at a cathode of each of said diodes, respectively, a voltage supply for applying a voltage to an anode of each said diode, and means comprising a logic gate connected to said anode of each said diode so as to detect the neutral range state.

* * * * *